United States Patent [19]
Madden

[11] Patent Number: 4,763,840
[45] Date of Patent: Aug. 16, 1988

[54] THRUST VECTORING EXHAUST NOZZLE ARRANGEMENT

[75] Inventor: William M. Madden, Palm Springs, Fla.

[73] Assignee: United Technologies Corporation, Hartford, Conn.

[21] Appl. No.: 36,540

[22] Filed: Apr. 9, 1987

[51] Int. Cl.$^4$ .......................... B64C 9/38; F02K 1/00
[52] U.S. Cl. ................... 239/265.35; 60/271; 239/265.39
[58] Field of Search ............ 239/265.35, 265.37, 239/265.39, 265.41; 60/230, 232, 271

[56] References Cited

U.S. PATENT DOCUMENTS

| | | |
|---|---|---|
| 2,858,668 | 11/1958 | Kelley et al. ............... 239/265.37 |
| 3,164,956 | 1/1965 | Colebrook et al. ............ 239/265.37 |
| 3,419,218 | 12/1968 | Campbell et al. ............. 239/265.37 |
| 4,375,276 | 3/1983 | Konarski ..................... 60/232 X |
| 4,519,561 | 5/1985 | Timms ........................ 60/230 |
| 4,605,169 | 8/1986 | Mayers ....................... 239/265.29 |
| 4,641,782 | 2/1987 | Woodward .................... 239/265.29 |

Primary Examiner—Andres Kashnikow
Assistant Examiner—Patrick N. Burkhart
Attorney, Agent, or Firm—Troxell K. Snyder

[57] ABSTRACT

A two-dimensional thrust vectoring nozzle (10) includes aftward divergent flaps (26, 28) positioned by a linkage assembly (38). The assembly (38) includes a linear track (42) pivotable about a transverse axis (44) for positioning a scissors linkage pivot (52) to selectively vary the divergence angle and vertical thrust vector of the nozzle (10).

5 Claims, 4 Drawing Sheets

THRUST VECTORING EXHAUST NOZZLE ARRANGEMENT

FIELD OF THE INVENTION

The present invention relates to a thrust vectoring exhaust nozzle having movable members for directing the flow of the exhaust gases.

BACKGROUND

Thrust vectoring exhaust nozzles are well known for use in aircraft propulsion systems or the like. Such nozzles typically redirect a portion of the exhaust gases exiting the aircraft gas turbine engine for the purpose of enhancing aircraft maneuverability or takeoff thrust. One particular type of thrust vectoring nozzle is termed "two-dimensional" by virtue of its having a roughly rectangular exhaust flow path defined by two laterally spaced apart static sidewalls and two vertically spaced apart movable surfaces. The movable surfaces operate to direct the exhaust gas flow as desired to produce varying degrees of thrust vectoring in the vertical plane.

As with any aircraft-related component or structure, the weight and complexity of such nozzles is of particular concern to designers. Prior art nozzles, relying on a multiplicity of individual actuators and related movable structure have proved effective in achieving thrust vectoring, but have generally achieved such functional success at the expense of increased weight and complexity.

Such designs are further complicated by the high gas temperature, up to 4,000° F. (2,200° C.) and pressure loading encountered by the flow directing surfaces. What is needed is a strong, simple nozzle arrangement and actuation means which can achieve the desired surface positioning with a minimum of individual actuators and total weight.

SUMMARY OF THE INVENTION

It is therefore an object of the present invention to provide a 2-D thrust vectoring exhaust nozzle for a gas turbine engine or the like.

It is further an object of the present invention to provide a convergent-divergent exhaust nozzle wherein thrust vectoring is achieved by orienting surfaces in the divergent section of the nozzle so as to selectively direct the exhaust gases.

It is further an object of the present invention to provide a drive linkage for orienting the divergent surfaces of the nozzle to independently achieve both a varying divergent exhaust gas flow path and selectively varying degrees of vectored thrust.

It is still further an object of the present invention to provide a linkage which is operable to position divergent nozzle flaps in a variable outlet area exhaust nozzle arrangement, wherein the nozzle throat defined by the displacement between the leading edges of the divergent flaps varies as a function of engine power output.

According to the present invention, a two-dimensional convergent-divergent exhaust nozzle having two spaced apart lateral sidewalls is provided with an upper and a lower divergent flap for defining both an expansion path for the engine exhaust gases and a means for directing the exhaust gas flow for achieving thrust vectoring in the vertical plane. Orientation of the divergent flaps is achieved by a pair of linkage assemblies mounted on the nozzle sidewalls and connected to the span ends of the divergent flaps at the trailing edges thereof.

The linkage assemblies according to the present invention each use two separate sets of rotary actuators to independently vary the divergence angle and thrust vector defined by the upper and lower divergent flaps. A pair of scissors linkages, disposed adjacent the sidewalls, positions the divergent flap trailing edges independent of the location of the divergent flap leading edge which may change in response to the current engine power level.

More specifically, the linkage assembly according to the present invention includes first and second scissors linkages, each having an upper and a lower drag link pivotably connected at one end thereof to the trailing edge of the corresponding upper or lower divergent flap, and pivotably connected to each other at the other end. The scissors linkages are selectively positioned by corresponding first and second pivotable tracks, secured to the first and second sidewalls and pivotable about a common axis. Each track includes a truck, cooperatively secured to the track, and means for translating the truck along the track. Each truck is joined to the corresponding scissors linkage, thus forming first and second variable four bar linkages for accurately positioning the upper and lower divergent flap trailing edges.

In operation, the angle of divergence defined by the divergent flaps is controlled by the displacement of the trucks along the linear tracks, while the degree of thrust vectoring is responsive to the angular displacement of the tracks about the common pivot axis. The linkage according to the present invention provides advantages over prior art actuators which may rely on a plurality of individual drivers and complex linkages to achieve thrust vectoring and variable divergence angle. Both these and other objects and advantages of the present invention will be apparent to those skilled in the art upon review of the following specification and the appended claims and drawing figures.

DETAILED DESCRIPTION OF THE PREFERRED EMBODIMENT

Figure 1:
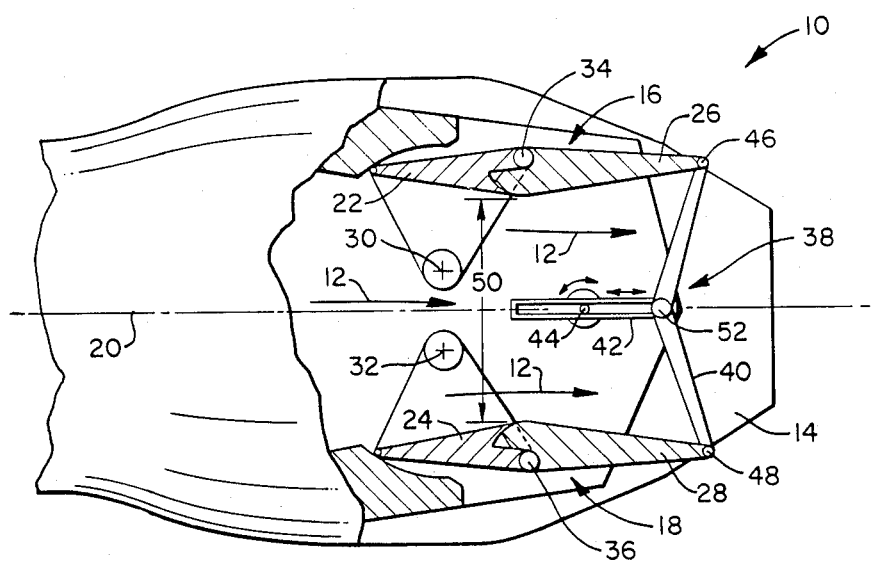
FIG. 1 shows a schematic of the linkage and nozzle according to the present invention in an unvectored, augmented thrust configuration.

FIG. 1 shows a cutaway cross sectional schematic arrangement of an exhaust nozzle 10 according to the present invention. Exhaust gases 12 from a gas turbine engine (not shown) flow axially aftward in a flow channel having lateral boundaries defined by spaced apart sidewalls 14, one of which is shown in FIG. 1, and upper and lower flow boundaries defined by upper and lower flap assemblies 16, 18. The flow passage is rectangular in cross-section and generally symmetrical about horizontal and vertical planes passing through the nozzle central axis 20.

The upper and lower nozzle assemblies 16, 18 are each comprised of forward convergent flaps 22, 24 and aftward divergent flaps 26, 28. The convergent flaps 22 extend spanwisely between the sidewalls 14 and are each pivotable about a corresponding offset pivot axis 30, 32 which extends transversely across the nozzle 10. The divergent flaps 26, 28 in each assembly 16, 18 are pivotably secured to the trailing edge of the respective upper or lower convergent flap 22, 24 thereby achieving an articulated assembly which may be positioned to achieve both a variable nozzle throat area 50 and thrust vectoring as discussed hereinbelow.

The convergent flaps 26, 28 are oriented within the nozzle 10 by a linkage assembly 38 which includes a scissors linkage 40 cooperatively linked to a linear track 42 which is in turn secured to one of the sidewalls 14 and pivotable about a transverse pivot point 44. The scissors linkage 40 is pivotally secured to the trailing edges 46, 48 of the divergent flaps 26, 28. A second linkage assembly similar to the linkage assembly 38 shown in FIG. 1 is disposed in the opposite sidewall (not shown in this Figure) for cooperatively positioning the opposite span end.

Figure 2:
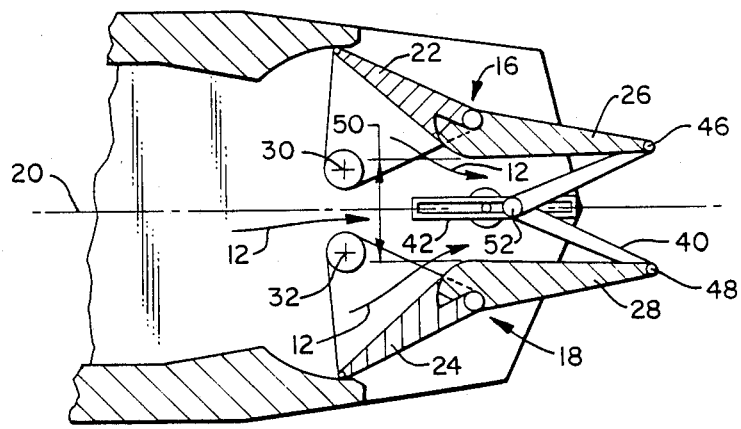
FIG. 2 shows a schematic of the nozzle flaps and scissor linkage according to the present invention in an unvectored, unaugmented configuration.
Figure 3:
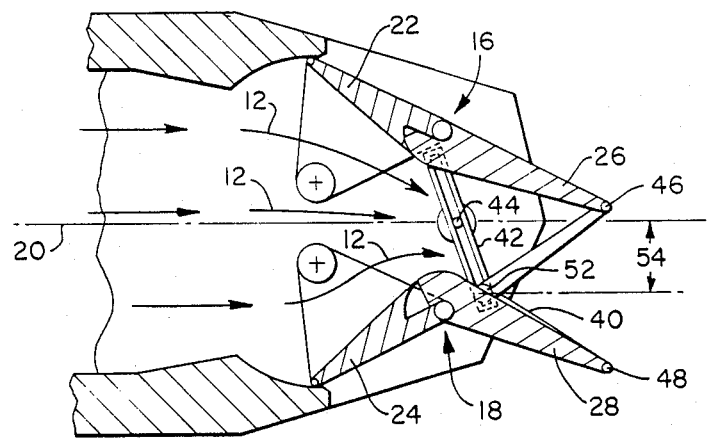
FIG. 3 shows the nozzle flaps and scissor linkage according to the present invention in a configuration for delivering unaugmented, 30° vectored thrust.

During operation of the nozzle 10 according to the present invention, the forward convergent flaps 22, 24 are pivoted about their respective pivot axes 30, 32 for achieving a variable nozzle throat area 50 defined by the displacement between the trailing edges of the convergent flaps 22, 24. The convergent flaps 22, 24 are pivoted symmetrically, ranging from the fully open position for receiving exhaust gases 12 during periods of full power, augmented engine operation, to a partially closed configuration for normal power, unaugmented engine operation as shown in FIGS. 2 and 3, to a fully closed configuration (not shown) wherein substantially all aftward exhaust gas flow is stopped for engine thrust reversing or other specialized operating conditions well known in the art.

Due to the hinge connection 34, 36 between the convergent flaps 22, 24 and the divergent flaps 26, 28, the trailing edges of the convergent flaps 22, 24 both support and position the leading edges of the corresponding divergent flaps. The linkage 38 must therefore have the ability to orient the divergent flaps 26, 28 as desired independent of the operation of the symmetrical convergent flaps 22, 24. The divergent flaps 26, 28 serve a dual aerodynamic function in the nozzle 10 according to the present invention by defining both the angle of divergence of the exhaust gas stream passing therebetween, and the degree of thrust vectoring achieved by directing the axially flowing exhaust gases 12.

The rate of divergence of the exhaust stream 12 is optimized responsive to the current mass flow, density, and engine power output to achieve the optimum thrust, efficiency, stall margin, etc. for the overall propulsion system. The configuration of FIG. 1 shows a fully open nozzle throat 50 and divergent flaps 26, 28 opened to give slightly increasing nozzle area therebetween. Such configuration would be typical of a nozzle during a period of engine operation at full power and full thrust augmentation from an upstream afterburner section (not shown) or the like.

As can be seen in FIG. 1, the linear track 42 of the linkage assembly 38 is oriented parallel with the nozzle axis 20 and the scissors linkage 40 has been positioned to equally displace the divergent flap trailing edges 46, 48 by positioning the scissors pivot 52 axially rearwardly along the track 42.

Figure 4:
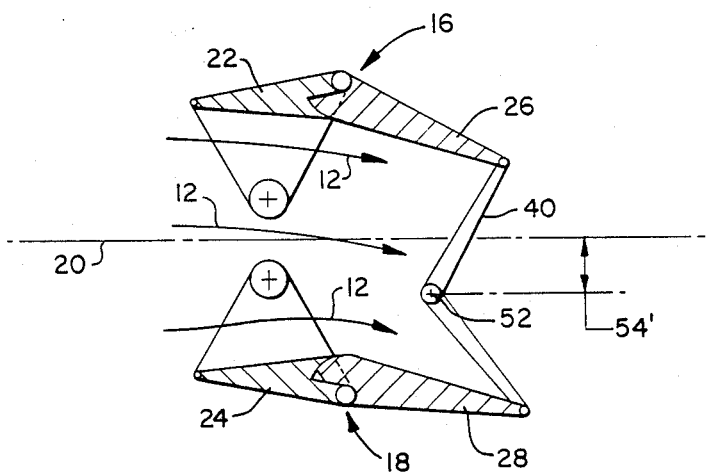
FIG. 4 shows the nozzle flaps and scissor linkage according to the present invention in a configuration for delivering augmented, 15° vectored thrust.

FIGS. 2, 3, and 4 show three additional operating configurations of the nozzle 10 according to the present invention. For simplicity, FIGS. 2, 3, and 4 show only the upper and lower flap assemblies 16, 18 and the scissors linkage 40.

FIG. 2 shows the flap assemblies 16, 18 positioned during a period of engine operation in an unaugmented, unvectored configuration. The convergent flaps 22, 24 have been pivoted to define a reduced nozzle throat 50 with the scissors pivot 52 being moved axially forward so as to orient the divergent flaps 26, 28 to provide a constant or slightly convergent flow passage downstream of the nozzle throat 50. By maintaining the scissors pivot 52 in the horizontal plane of the nozzle axis 20, the divergent flaps 26, 28 remain substantially vertically symmetrical with respect to the axis 20.

FIG. 3 shows the upper and lower assemblies 16, 18 again configured for unaugmented engine power, but with the divergent flaps 26, 28 positioned to deliver vectored thrust from the nozzle centerline 20 by an angle of 30°. The convergent flaps 22, 24 are positioned as in the FIG. 2 configuration, however the divergent flaps 26, 28 are asymmetrically oriented by the scissors linkage 40. As can be seen from the broken outline of the linear track 42, the track 42 has been pivoted about the common pivot axis 44, thus displacing the scissors pivot 52 from the horizontal plane defined by the nozzle axis 20 by a distance 54. Such displacement positions the trailing edges 46, 48 of the divergent flaps 26, 28 asymmetrically with respect to the horizontal plane, thus directing the exhaust gases 12 at an angle from the nozzle axis 20.

FIG. 4 shows the flap assemblies 16, 18 configured so as to deliver 15° of vectored thrust during a period of augmented engine operation. It should be apparent without extensive discussion that the convergent flaps 22, 24 are fully open to define a maximum nozzle throat 50, and that the divergent flaps 26, 28 have been asymmetrically oriented with respect to the nozzle axis 20 by displacing the scissors pivot 52 a distance 54' from the horizontal plane defined by such axis 20. The gases 12 are thus directed at an angle to the axis 20 thereby providing the desired degree of vectored thrust.

Figure 5:
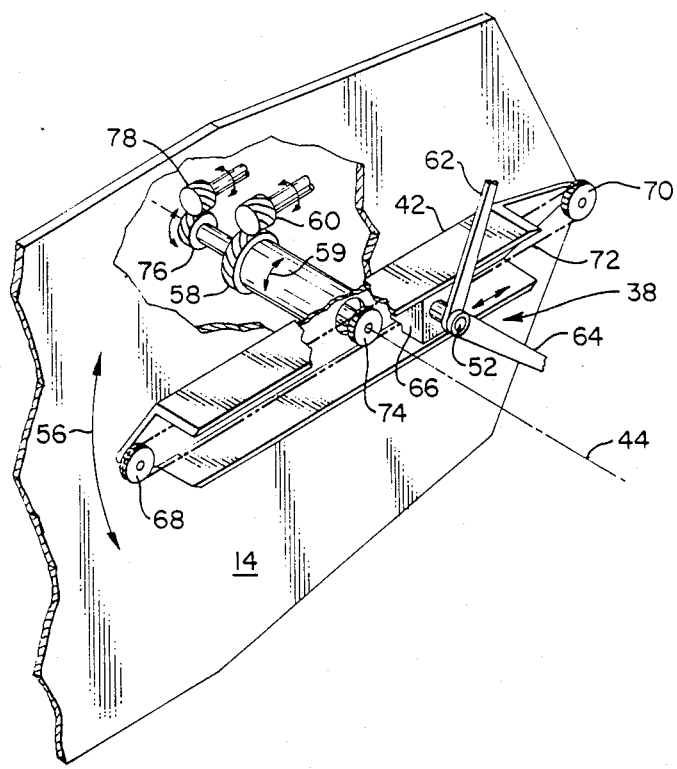
FIG. 5 shows a more detailed representation of the pivotable linear track according to the present invention.

FIG. 5 shows a more detailed isometric view of the linkage assembly 38 according to the present invention. The linear track 42 is pivotable about the pivot axis 44 in a plane generally parallel to the sidewall 14. The pivoting motion 56 of the track 42 may be induced by a variety of angular actuators known in the art, one of which is shown in FIG. 5 as including a combination ring gear 58 and driven worm gear 60 whereby a rotary motor (not shown) spins the worm gear 60, hence causing the ring gear 58 and linear track 46 to rotate 59 as desired. The drag links 62, 64 of the scissors linkage 40 are pivotally secured at the scissors pivot 52 to a movable truck 66 received within the linear track 42 and translatable therealong. Translation of the truck 66 is induced in the FIG. 5 embodiment by a sprocket and chain arrangement including a pair of idler sprockets 68, 70, a chain 72 passing around the sprockets 68, 70 and linked to the truck 66, and a drive sprocket 74 rotating about an axis coincident with the transverse axis 44 of the track pivot. Drive sprocket 74 is rotated by a ring gear 76 and worm gear 78 combination for positioning the truck 66 along the linear track 42 as desired. While many actuators may be used to position the truck 66 and track 42, the ring gear and worm gear combinations 58, 60, 72, 78 as shown in FIG. 5 provide a simple, extremely powerful mechanism for positioning the various components.

It will be appreciated by those skilled in the art of nozzle design that such variable surface nozzles require accurate scheduling of the surface position with the current or transitional engine power output. Such scheduling may utilize feedback position sensors to assist the various actuators in accurately positioning the various flaps 22, 24, 26, 28 and linkages 38 to achieve the desired optimum orientations.

Figure 6:
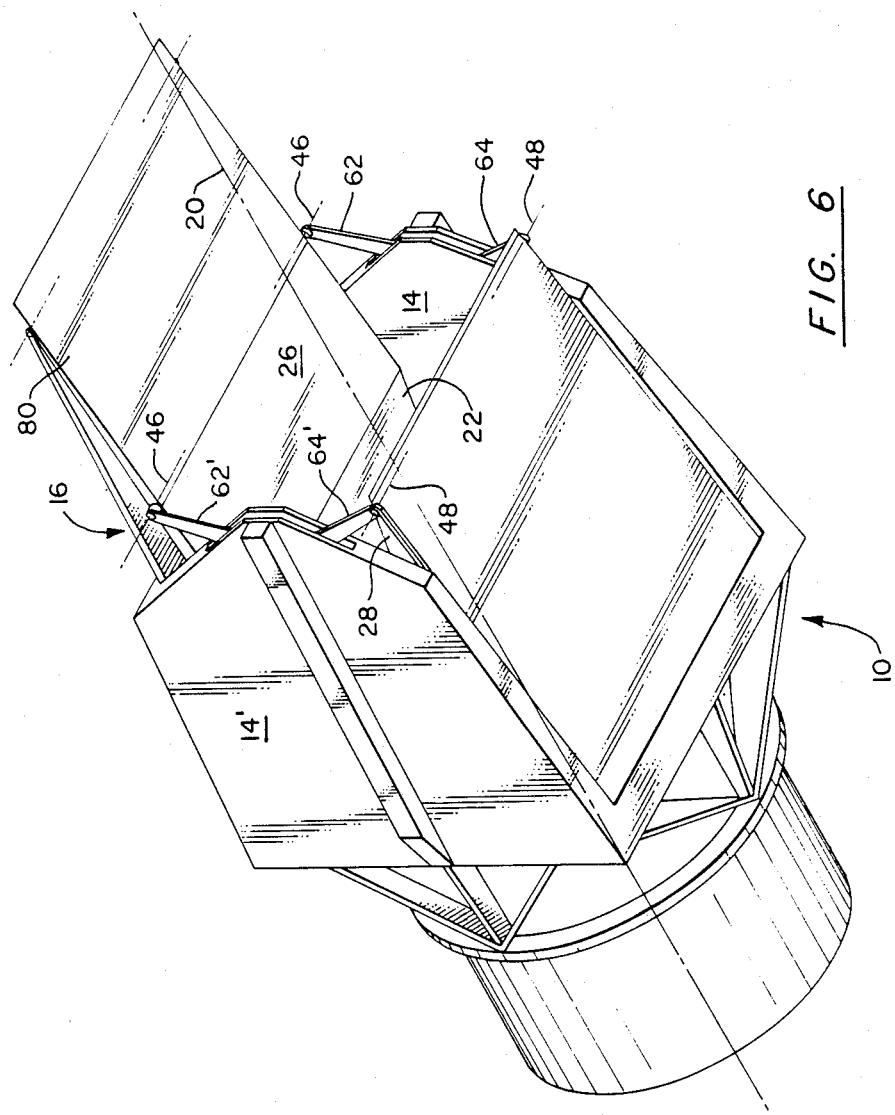
FIG. 6 shows an external, isometric view of a nozzle according to the present invention as a complete package.

FIG. 6 shows a nozzle 10 according to the present invention in an exterior view so as to better give an appreciation for the arrangement of the various components. The convergent and divergent flaps 22, 26 of the upper flap assembly 16 are visible as are both sidewalls 14, 14'. The drag links 62, 64, 62', 64' of the scissors linkages are shown protruding from within the sidewalls 14, 14' and connecting to the span ends of the trailing edges 46, 48 of the upper and lower convergent flaps 26, 28.

Also shown in FIG. 6 is an exit ramp 80 secured to the trailing edge 46 of the upper divergent flap 26 for providing an additional expansion surface for the exhaust gases exiting the nozzle 10. Such exit ramps may be used in conjunction with the nozzle 10 according to the present invention depending on the particular circumstances, requirements and expected operating environment.

The nozzle and linkage according to the present invention is thus seen to provide a simple, accurate means for positioning nozzle surfaces for redirecting or otherwise modifying the flow of exhaust gases from a gas turbine engine. The combination of the scissors linkage and pivotable linear track allow a balancing of the forces on the various linkage components, thus reducing the working stress and extending the service life thereof. It should further be noted that the embodiment of the invention disclosed hereinabove is only one of a variety of equivalent embodiments which may occur to those skilled in the art, and as such should not be construed as limiting the scope of the present invention beyond the recitation of the claims presented hereinbelow.

I claim:

1. A two-dimensional thrust vectoring exhaust nozzle for a gas turbine engine, comprising:
   first and second laterally spaced apart sidewalls for defining corresponding first and second lateral exhaust gas boundaries in the nozzle;
   upper and lower movable flap assemblies, each assembly extending between the first and second sidewalls and defining respective upper and lower gas flow boundaries, each flap assembly further including
   a forward flap, selectively pivotable about an axis extending between the first and second sidewalls and having a leading edge and a trailing edge,
   an aftward flap, having a trailing edge and a leading edge pivotably secured to the trailing edge of the forward flap, and
   means for selectively positioning the trailing edges of the aftward flaps of the upper and lower flap assemblies, including
   first and second scissors linkages, each scissors linkage including elongated, equal length upper and lower drag links, one end of each drag link being pivotally secured proximate the span end of the trailing edge of the corresponding upper or lower aftward flap, and the other end of each upper drag link being pivotally secured to the other end of the respective lower drag link,
   a first and a second linear drive track, each track secured to the respective first and second sidewalls and selectively pivotable in a plane substantially parallel thereto, and
   first and second trucks, each truck cooperatively engaged with the respective first and second drive track and selectively positionable therealong, each truck being pivotally secured to the respective first and second scissors linkage at the pivotable joint between the other ends of the upper and lower drag links.

2. An exhaust nozzle as recited in claim 1, further comprising:
   means for selectively pivoting the first and second tracks, and
   means for selectively translating the first and second trucks along the respective first and second tracks.

3. The nozzle as recited in claim 2, wherein
   the pivoting means for the first and second tracks each include a ring gear and a worm gear, and wherein
   the means for selectively translating the first and second trucks each include a sprocket and chain combination.

4. The nozzle as recited in claim 1, wherein
   the forward flaps are each offset radially with respect to each of the corresponding pivot axes.

5. A two-dimensional, convergent-divergent exhaust nozzle for a gas turbine engine, comprising:
   first and second laterally spaced part, parallel sidewalls for defining lateral flow boundaries in the nozzle;
   upper and lower divergent flaps, each having a leading edge and a trailing edge, and each extending spanwisely across the nozzle between the sidewalls, each flap further being pivotally supported at the leading edge thereof and selectively positioned at the trailing edge thereof by first and second linkage assemblies, each linkage assembly including
   first and second scissors linkages, each scissors linkage including elongated, equal length upper and lower drag links, one end of each drag link being pivotally secured proximate the span end of the trailing edge of the corresponding upper or lower divergent flap, and the other ends of each upper and lower drag link being pivotally secured at a scissors pivot,
   a first and a second linear track, each track secured to the respective first and second sidewalls and selectively pivotable in a plane substantially parallel thereto, and
   first and second trucks, each cooperatively engaged with the respective first and second drive tracks and selectively positionable therealong, each truck being secured to the respective scissors joints of the first and second scissors linkages for selectively positioning the scissors joints responsive to the current engine power output and desired thrust vector.

* * * * *